Figure 1:
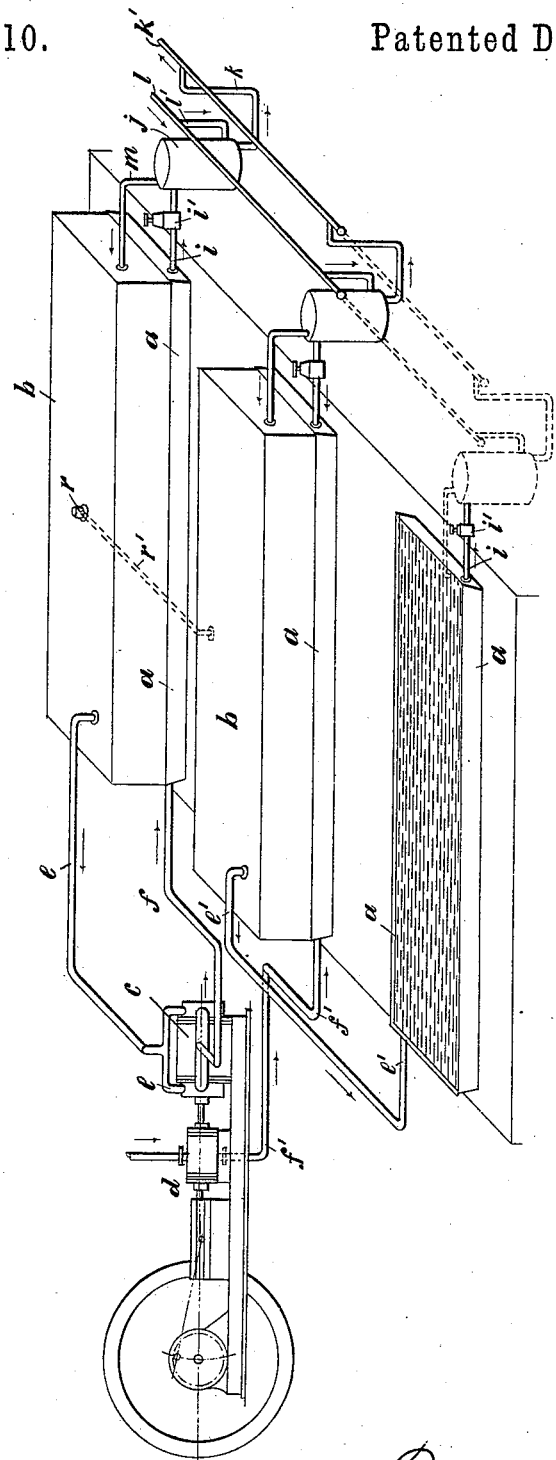

(No Model.) 3 Sheets—Sheet 1.
R. C. WILSON.
APPARATUS FOR THE MANUFACTURE OF SALT FROM BRINE.

No. 466,210. Patented Dec. 29, 1891.

Witnesses
J. A. Rutherford.
J. H. Daly.

Inventor.
Reginald Coates Wilson
By James L. Norris.
Attorney.

(No Model.)  3 Sheets—Sheet 2.
R. C. WILSON.
APPARATUS FOR THE MANUFACTURE OF SALT FROM BRINE.
No. 466,210.  Patented Dec. 29, 1891.
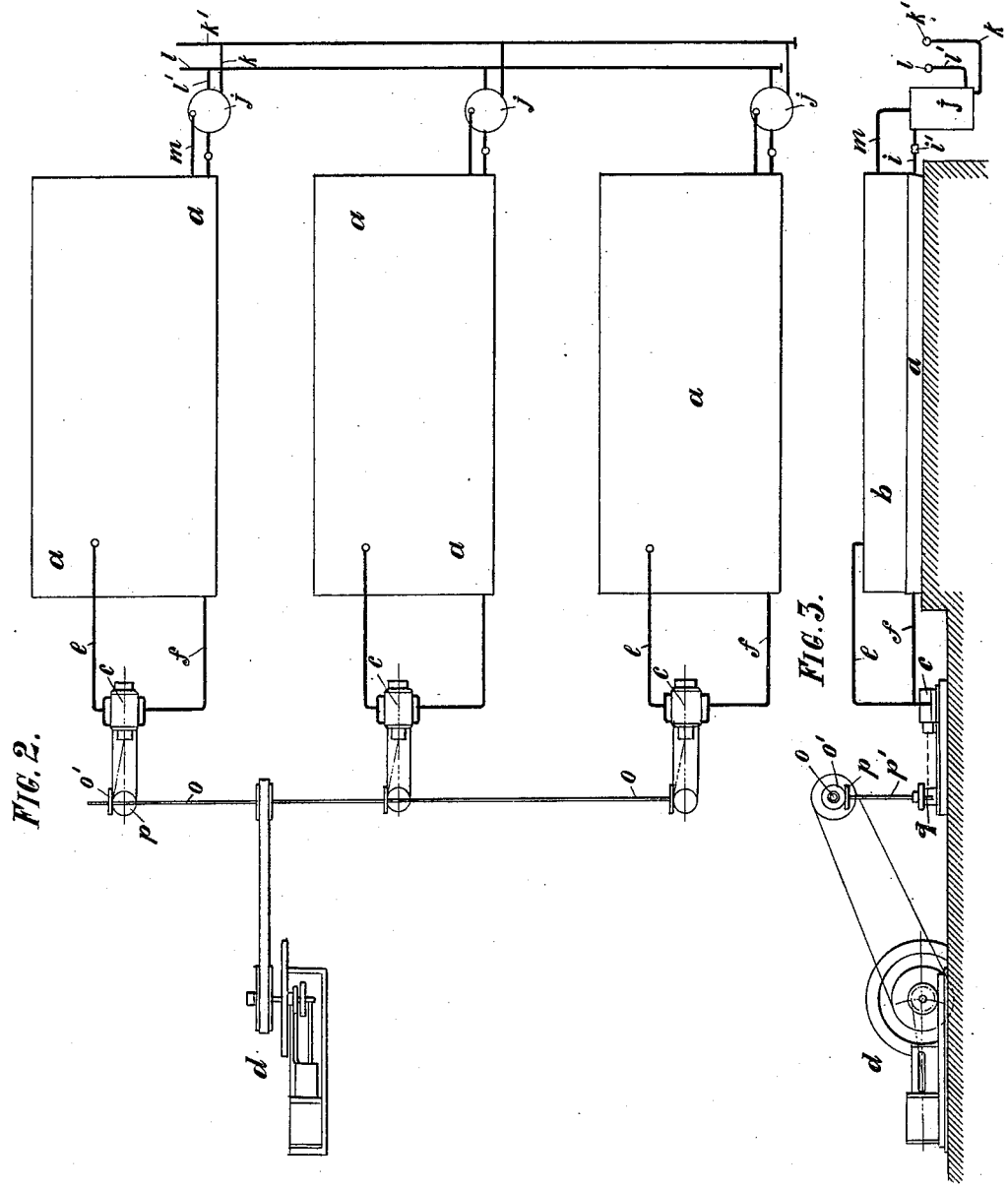
Witnesses.
J. A. Rutherford.
J. H. Daly.
Inventor.
Reginald Coates Wilson
By James L. Norris
Attorney.

(No Model.) 3 Sheets—Sheet 3.
R. C. WILSON.
APPARATUS FOR THE MANUFACTURE OF SALT FROM BRINE.
No. 466,210. Patented Dec. 29, 1891.
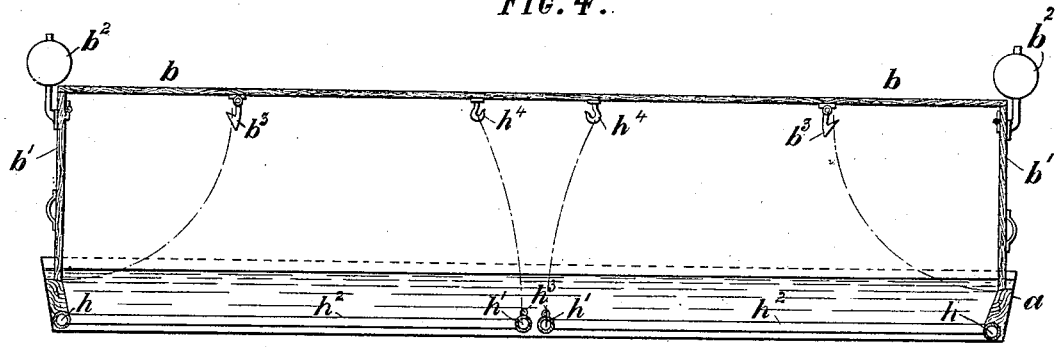
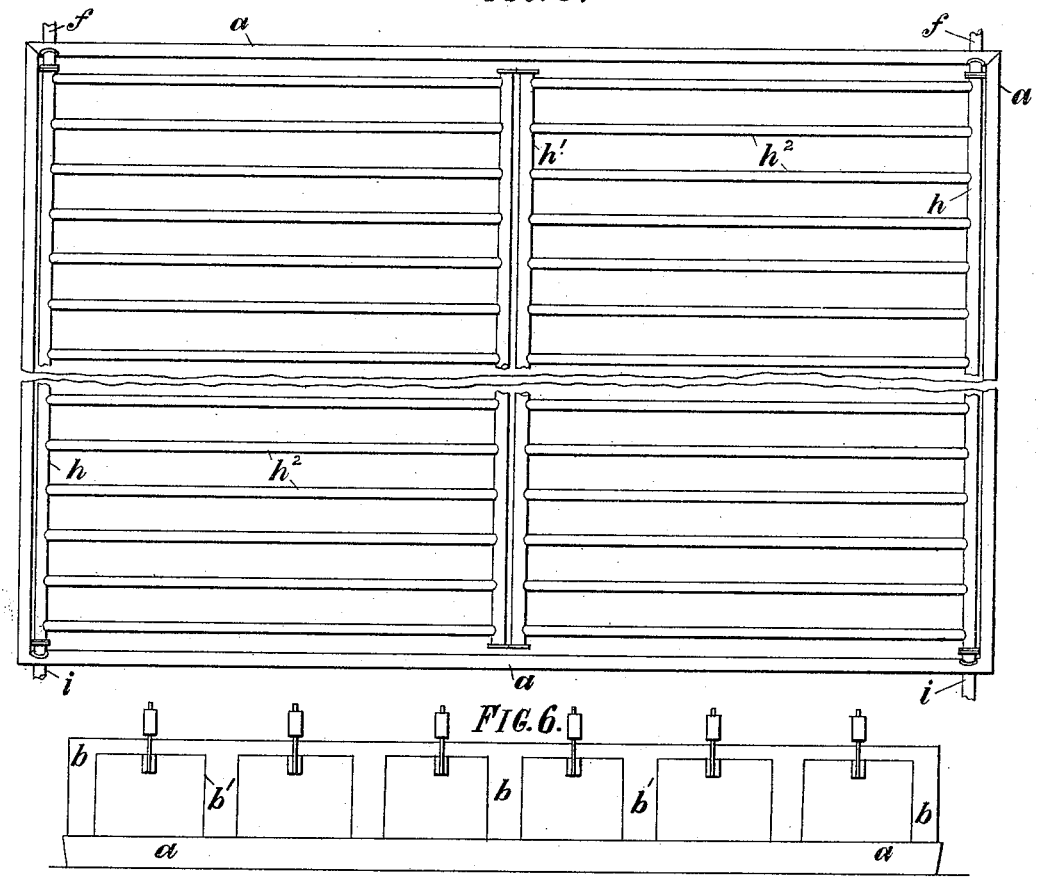
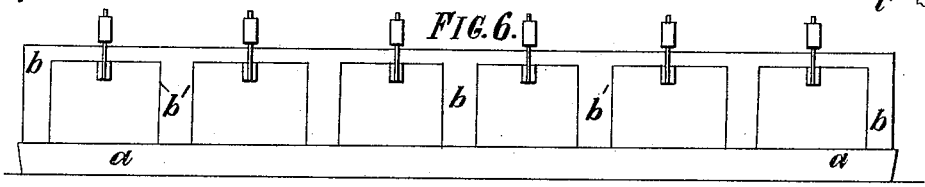

UNITED STATES PATENT OFFICE.

REGINALD C. WILSON, OF LIVERPOOL, ENGLAND.

APPARATUS FOR THE MANUFACTURE OF SALT FROM BRINE.

SPECIFICATION forming part of Letters Patent No. 466,210, dated December 29, 1891.

Application filed April 18, 1891. Serial No. 389,499. (No model.)

*To all whom it may concern:*

Be it known that I, REGINALD COATES WILSON, a subject of the Queen of Great Britain and Ireland, residing at Liverpool, England, have invented certain new and useful Improvements in Apparatus for the Manufacture of Salt from Brine; and I do hereby declare that the following is a full, clear, and exact description of the invention, which will enable others skilled in the art to which it appertains to make and use the same.

This invention has, chiefly, for its object to produce salt from saturated saline solutions in a more economical and efficient manner than that in common practice at the present time.

In the apparatus for evaporating brine and manufacturing salt therefrom, involving the improvements according to this invention, the evaporating-vessels are closed—that is, covered in—and the steam or vapor given off from the brine during the process of evaporation is conveyed to a pump or compressor mechanically operated, by which it is compressed and its temperature raised. In this compressed and heated condition it is passed into and through suitable pipes or conduits submerged in or in contact with the brine to be evaporated, with the result that a transference of heat from the fluid of the higher temperature to that of the lower temperature takes place, and the steam is condensed, the brine to be evaporated serving as the condensing-fluid. The latent heat given out in and due to the condensation of the steam is thus transmitted to the brine, and a weight of water of such brine at boiling-point approximately equal to the weight of steam condensed by it is evaporated. The water resulting from the condensation of the steam will of course be at a temperature corresponding with the pressure of fluid within the heating pipes or conduits, and its sensible heat is utilized by passing it through or round tubes or conduits in contact with the feed-brine, so causing it (the sensible heat) to be transferred to a considerable extent to such brine. In this manner a large proportion of the total heat of the steam given off from the brine may be recovered and utilized for the evaporation of a corresponding weight of water of the brine to that from which it was originally produced. If the compressor be worked by a steam-engine, then the exhaust-steam thereof would be used in a corresponding manner to that above described to evaporate brine in a separate or other evaporator, and the vapor from the brine so evaporated may be used in another pan closed or open, or, according to another mode of utilizing the exhaust-steam, it may be passed, together with the compressed steam, under the first specified evaporator, or partly in one way and partly in another. If the compression of steam is effected by a water-motor in lieu of by steam, of course the necessary compression and heat would be obtained without the expenditure of any fuel.

According to the present invention the present ordinary pans or equivalent pans are utilized in the carrying out of the invention and the pipes or conduits through which compressed steam is passed are placed in the pan itself and submerged in the brine, the pan serving thus at once as or constituting the evaporating-vessel and condenser. The pan itself is covered over by non-conducting material, such as wood-work, which may be packed, stuffed, or lagged with non-conducting material of any suitable kind, if necessary or desired, and provided with doors so arranged that access may be had to the space covered over for drawing off the salt whenever required. The tubes or conduits in the pan used for conveying the compressed steam are so arranged that they do not interfere materially with the process of raking or removing the salt. In working the process the pressure of steam within the space above the pan should be slightly above that of the atmosphere, so as to exclude air, and the process may be so worked that the steam drawn off by the engine is less than that made, and thus steam is always blowing off, say, into the second-pan space or otherwise. The heating-tubes, pipes, or conduits in the pan are preferably so arranged that they can be turned up or taken out and easily and rapidly scraped and cleaned.

In cases in which a battery of pans is worked according to this invention one arrangement of plant for compressing the steam may consist in providing a single motor—say a steam-engine—and a number of compressors, the motor being adapted to drive by suitable gearing two or more suitable compressors, one compressor being used in connection with each pan.

In the drawings which serve to illustrate the invention, Figure 1 is an isometrical perspective view of an arrangement of plant under the invention wherein a steam-engine is employed to compress the steam and the exhaust-steam of the engine is utilized in a pan to evaporate the brine. Fig. 2 is a plan of plant; and Fig. 3 is an end view of the arrangement wherein an engine is adapted to drive several compressors, one compressor being used in connection with each pan. Fig. 4 shows a pan covered and arranged according to this invention. Fig. 5 is a plan of same with the covering removed; and Fig. 6 is a side elevation to a smaller scale, showing same and the doors therein.

Referring to the drawings, $a$ designates the pan.

$b$ is the covering.

$c$ is the steam-compressing cylinder.

$d$ is the motor.

$e$ is the pipe which conveys the steam from the pan to the steam-compressor.

$f$ is the pipe through which the compressed steam passes from the compressor to the heating-tubes of the pan.

$h\ h'\ h^2$ are the heating-tubes of the pan.

$i$ is the pipe by which the condensed water passes from the pan.

$j$ is a feed-brine heater connected to the pan by the pipe $i$.

$k$ are pipes by which the condensed water passes from the feed-heaters $j$.

$k'$ is a discharge-pipe connecting the pipes $k$.

$l$ is a main brine-feed pipe.

$l'$ are branch feed-pipes from the main pipe $l$ to the feed-heater $j$.

$m$ is a pipe for conveying the heated brine from the feed-heater to the pans.

The pans $a$ shown in the drawings are made of the same shape as those now generally used in the manufacture of salt from brine, and may be taken as representing the existing pans of a salt-works. The covering $b$, which may be of wood or metal properly lagged with a bad conductor of heat, is set into the pan, as shown, and dips into the brine therein, so that a liquid seal is provided at the point of juncture of the pan and cover in addition to the mechanical joint which would be made.

The doors of the covering $b$ are designated $b'$ and are provided with a counterbalance-weight $b^2$ and adapted by any known suitable kind of closing device to be drawn up tight onto the frames in which they fit, or this action may be effected by weights tending to press them into their frames. If the covering be of wood or other soft material, the frames may be made of metal of any suitable kind where the doors touch them, and the doors themselves may be similarly provided with metal case or edging, so as to render the construction of a steam-tight joint easy and simple. Any suitable known kind of gear or mechanism may be used to operate the doors, and a catch $b^3$ is provided on the roof of the covering to engage with the end of the doors and hold them up when opened for the purpose of removing the salt or other object.

The pipes at the bottom of the pan, into which the compressed steam is passed and which are used for heating the brine, consist in the examples shown in Figs. 4 and 5 of longitudinal tubes $h'$, disposed along the edge of the pan, longitudinal tubes $h'$, disposed also along the pan, about the center thereof, and transverse pipes $h^2$, connecting said longitudinal pipes $h$ and $h'$ together. It will be seen that two of these sets of heating-pipes are shown in the pan. This is for the object of rendering the cleaning and other operations connected with them easy. The outer tubes $h'$ are provided with rings $h^3$ or equivalent devices, by which they are adapted to be raised by tackle or other means suspended from the hook $h^4$ on the roof, it being merely necessary for this object to connect the tackle, work it, and raise the tubes $h'$ up, the tubes $h$ serving as the axis about which the movement takes place. The steam-pipe $f$ passes through the pan sides, as shown, as does also the condensed-water-outlet pipe $i$, and the pipe $h$ is connected to such pipes by flanges or suitable kinds of working steam-tight joints. The pipes $h'$ stand at a higher level than $h$, and thus the transverse pipes $h^2$ have a fall toward $h$, and the water condensed within the system thus gravitates to the pipes $h$, from whence it passes out of the pan by way of the pipes $i$.

Air which may accumulate in the system may be withdrawn by suitable pipes connected with the pipes $h'$, leading out of the apparatus.

In Figs. 1, 2, and 3 only single steam-inlet pipes $f$ and water-outlet pipes $i$ are shown. This is done for the sake of clearness; but as a matter of fact if the heating-pipes in the pan were arranged as shown in Figs. 4 and 5 the pipe $f$ would of course have to be in duplicate to feed the two pipes $h$, as would also the water-outlet pipes $i$.

In Fig. 1 three pans are used. The first one is shown to be acted upon directly by the pump $c$, driven by the motor $d$—that is to say, the steam given off from the brine in this pan is taken into the compressor $c$ through the pipe $e$ and is returned to the heating-pipes $h\ h'\ h^2$ through the pipe $f$ compressed. This system, connected with the pans presents a complete cycle within itself, the heat given off from the heating-pipes being transferred to the brine, the vapor from which is again drawn into the pump $c$, compressed, and again returned. If a steam-motor is employed, the degree of compression to which the steam is subjected may be conveniently from about fifteen to thirty pounds above that of the atmosphere. In the second pan the exhaust-steam from the motor $d$ is led to the heating-pipes thereof by the pipe $f'$, say, at the same pressure and temperature as that delivered to the heating-pipes of the first pan and acts identically in the same way upon the brine, the steam, however, from this pan being conveyed in an uncompressed state to the third pan by a pipe $e'$ to the heating-pipes thereof. The pan in this example is an open one. The pans would be preferably so worked that less steam would be withdrawn from them than is produced therein, so that at all times a proportion of steam will be blowing off. By this mode of working the exclusion of atmospheric air is rendered absolute, and it will be evident that this proportion need only be a very small one and that the pressure under which the pan may be worked need be merely the fraction of a pound. If desired, this steam from the first pan may be conveyed into the second or to the third with that of the second. An ordinary relief-valve properly adjusted provides a convenient means for carrying off this steam. Such a valve may be placed at $r$ in Fig. 1 and the steam conveyed away by a pipe $r'$. If the heat given off to the brine by the compressed steam in the pan is not sufficient (which it may not be) to provide for that withdrawn plus that blown off and that which leaks away and is lost by radiation or conduction, it may be made up by supplying other steam under the proper pressure from any suitable source, if desired, or by keeping a small fire beneath the pan or by superheating the compressed steam; but in any case this proportion of additional heat will necessarily be insignificant relatively to the proportion recovered and reused and to the consequent quantity of fuel saved by the use of the methods and systems herein set forth—that is to say, it is possible to recover from the total heat of the compressed steam supplied to the pan from ninety to ninety-five per cent. and reuse it over and over again in evaporating fresh quantities of brine. As a modification in lieu of using a feed-heater, as herein described, the hot condensed water may be pumped or forced into the steam-generator which supplies the motor with steam, and by this mode of carrying out the invention the already small quantity of heat of the fuel used to raise the pressure and temperature of the steam is further reduced, or in lieu of this mode the water supplied to the steam-generator may be that discharged from the feed-heaters. By this latter mode rather better results will be obtained than by the former. To maintain the required pressure in this system of heating-pipes, a loaded valve or steam-trap $i'$ is placed on the pipes $i$ and is interposed between the pan and the feed-brine heater $j$, or this valve may be disposed on the fresh-water-discharge branches $l'$ or $l$ or any suitable place or places desired. The feed-heater $j$ may consist of any suitable form of surface-heating apparatus generally known as "feed-heaters" or "condensers." The cold brine being passed into it from the branches $l'$ and passing through the conduits therein surrounded by the hot water from the pan leaves it and passes into the pipe $m$ in a heated state, while the heat of the water which serves to heat the brine has been transferred thereto and leaves the feed-heater in a comparatively cool state by the pipes $k$. As far as possible, therefore, the sensible heat of the water resulting from the condensation of the heating-steam is abstracted by these feed-heaters, while the main portion of the heat of the compressed steam—namely, the latent heat—is transferred to the brine within the pan, as previously explained. It will be plain that in the case where water or other natural power is available for the purposes of compressing the steam the second pan and the mode of heating it as described with reference to Fig. 1 will not be available.

With reference now to Figs. 2 and 3, the system illustrated in these figures is one in which each pan is provided with a separate compressor $c$, such compressors being driven from a common motor $d$. In the example illustrated in carrying out this system the motor $d$ is adapted to drive an overhead shaft $o$, having upon it toothed or friction bevel-wheels $o'$, which gear with horizontally-disposed bevel-wheels $p$, mounted upon the upper end of vertical shafts $p'$, the lower ends of which are provided with disk or other cranks $q$, driving the compressing-piston of the pump. Each of the pumps would be adapted to be worked separately—that is, independently driven or stopped. This may be done by friction or other clutches of any known suitable kind arranged on the shaft $o$, and the stroke of the pump $c$ may be a variable one, so that in the different pans different quantities of heat may be supplied and at varying rates of temperatures, thus rendering it possible in a plant arranged in this manner to produce different qualities or grades of salt. The alteration of the stroke of the pump $c$ may be effected by providing these pumps with adjustable crank-pins and connecting-rods, so that the stroke may be longer or shorter, as required, but at the same time keeping the clearance constant. It will be plain that other known kinds of gearing than the one shown may be adapted to effect the variable rate of pumping above specified. The feed-heaters $j$ are shown provided in this system, and they work in the same manner as those described with reference to Fig. 1. At the same time in this or any other arrangement under this invention it is not necessary that the exhaust-steam of a motor be used, as, if it be a condensing-engine, the whole of the steam would be condensed and not available for the purpose of evaporating the brine. However, such a system of working is not preferred.

In the operation of manufacturing salt by apparatus constructed as set forth with reference to Figs. 4, 5, and 6 when a sufficient quantity of salt has been deposited the doors $b'$ are opened, and it is removed (or first washed and then removed) by scraping it to the sides of the pan (doors being provided on each side) and lifting it out in the ordinary way. During this operation the extraction of steam may be stopped.

Suitable cocks or valves will be provided on any of the parts or conduits, as desired, for the purpose of controlling the flow of the fluids.

Having thus described my invention, what I claim is—

1. Apparatus for making salt from brine, consisting of a flat-bottomed shallow horizontally-disposed pan or pans $a$, of extended superficial area, having a small depth of brine therein and having a cover $b$, a pump $c$ for drawing off and compressing steam made in the pan, a grid or system of horizontally-arranged pipes disposed at or near the bottom of said pan or pans and immersed in the brine therein, whereinto the compressed steam is forced, a pipe $e$, connecting said pan, by which steam is conducted to the pump, a pipe connecting said pump with the heating-pipes, by which the compressed steam is conducted to said pipes from the pump, and a motor $d$ for working the steam-compressor, the parts being combined substantially as set forth.

2. Apparatus for making salt from brine, consisting of a pan or pans $a$, horizontally arranged, having a cover $b$, a pump $c$, connected to the pan or cover by a suitable pipe and by which steam is drawn off from said pan and compressed, a system of horizontally-disposed pipes in said pan, to which the compressed steam is conducted and wherein it is condensed, a pipe by which said steam is conducted from the compressing-pump to said pipes, a steam-motor $d$ for working the pump and adapted to exhaust at a pressure having a temperature higher than that at which brine boils at atmospheric pressure, and a second horizontally-arranged pan or set of pans having horizontally-disposed pipes therein and immersed in the brine therein and to which the said exhaust-steam from the steam-motor is conveyed by a suitable pipe, the parts being combined substantially as set forth.

3. Apparatus for making salt from brine, consisting of a flat-bottomed horizontally-arranged pan or pans $a$, of extended horizontal area, having a cover $b$, a pump $c$ for drawing off and compressing steam made in the pan, a grid or system of pipes horizontally disposed at or near the bottom of said pan or pans and immersed in the brine therein, whereinto the compressed steam is forced and condensed, a motor for compressing the steam, a pipe connecting said pan with the pump, by which steam is conducted to the pump, a pipe connecting said pump with said heating-pipes, by which the compressed steam is conducted to said heating-pipes from the pump, and a feed-heating vessel into which the fresh brine is introduced by a suitable pipe and through which the water condensed from the steam in the pan-pipes is passed by suitable pipes or conduits, whereby the sensible heat of such water is utilized, the parts being combined substantially as set forth.

4. Apparatus for making salt from brine, consisting of a closed flat-bottomed horizontally-arranged pan or pans $a$, having a cover $b$, a pump $c$ for drawing off and compressing steam made in the pan, a system of pipes disposed near the bottom of said pan or pans and immersed in the brine therein, whereinto the compressed steam is forced and condensed, a steam-motor for working the compressor, a pipe $e$, connecting said motor with the steam-space of said pan, a second or other closed horizontal flat-bottomed pan or pans, a system of pipes disposed near the bottom of said pan and immersed in the brine therein, a pipe $f'$, connected with the steam-motor and said system of pipes in said second pan, whereby the exhaust-steam is conveyed from said motor to said pipes and is condensed therein, and means, substantially as described, by which the pressure within said systems of heating-pipes is maintained, the parts being combined substantially as and for the purposes set forth.

5. Apparatus for making salt from brine, consisting of a flat bottomed horizontally-arranged pan or pans $a$, having a cover $b$, a pump $c$ for drawing off and compressing steam made in the pan, a system of heating-pipes disposed near the bottom of said pan or pans and immersed in the brine therein, whereinto the compressed steam is forced and condensed, a steam-motor for compressing the steam, a second or other horizontal flat-bottomed pan or pans, a system of heating-pipes disposed near the bottom of said pan and immersed in the brine therein, a pipe $f'$, connecting the steam-motor and said system of pipes in said second pan, whereby the exhaust-steam of said motor is conveyed therefrom to said heating-pipes and is condensed therein, another or third horizontal flat-bottomed pan, a system of heating-pipes disposed near the bottom of said pan and immersed in the brine therein, a pipe $e'$, connecting the steam-space of said second pan with the system of pipes of said third pan, whereby steam is conveyed from said second pan to said heating-pipes, the parts being combined substantially as and for the purposes set forth.

In testimony whereof I hereunto affix my signature in presence of two witnesses.

REGINALD C. WILSON.

Witnesses:
ERNEST R. ROYSTON,
   15 *Water Street, Liverpool.*
JOHN TAYLOR,
   16 *Valley Road, Liverpool.*